(12) United States Patent
Airola et al.

(10) Patent No.: US 6,583,218 B1
(45) Date of Patent: Jun. 24, 2003

(54) COMPOUNDED UNSATURATED POLYESTER RESIN COMPOSITIONS WITH A REDUCED MONOMER CONTENT

(75) Inventors: Karri Airola, Porvoo (FI); Paul Mahbub, Porvoo (FI); Eija Valtonen, Porvoo (FI)

(73) Assignee: Ashland, Inc., Covington, KY (US)

( * ) Notice: Subject to any disclaimer, the term of this patent is extended or adjusted under 35 U.S.C. 154(b) by 0 days.

(21) Appl. No.: 09/807,898

(22) PCT Filed: Oct. 19, 1999

(86) PCT No.: PCT/FI99/00869

§ 371 (c)(1), (2), (4) Date: Jun. 12, 2001

(87) PCT Pub. No.: WO00/23521

PCT Pub. Date: Apr. 27, 2000

(30) Foreign Application Priority Data

Oct. 19, 1998 (FI) .................................................. 982264

(51) Int. Cl.[7] ........................ C08L 67/06; C09D 167/06
(52) U.S. Cl. ............................ 525/25; 525/27; 525/42; 525/44; 525/48; 525/49; 525/444; 428/482
(58) Field of Search ............................ 525/25, 27, 42, 525/44, 48, 49, 444

(56) References Cited

U.S. PATENT DOCUMENTS 4,263,195 A 4/1981 Vargiu et al.
5,270,104 A * 12/1993 Mori ........................ 428/220
5,688,867 A 11/1997 Scheibelhoffer et al.

FOREIGN PATENT DOCUMENTS

| EP | 0325154 | 7/1989 |
| EP | A2325154 | 7/1989 |
| EP | 0598227 | 5/1994 |
| EP | A1598227 | 5/1994 |
| EP | 0814107 | 12/1997 |
| EP | A1814107 | 12/1997 |

OTHER PUBLICATIONS

JP 10036459 (abstract) WPI, Derwent Publication, Feb. 10, 1998.
JP 11172092 (abstract) WPI, Derwent Publication, Jun. 29, 1999.
English language Abstract of JP 10036459 Feb. 10, 1998.
English language Absract of JP 11172092 Jun. 29, 1999.

* cited by examiner

Primary Examiner—Patricia A. Short
(74) Attorney, Agent, or Firm—Birch, Stewart, Kolasch & Birch, LLP

(57) ABSTRACT

A compounded unsaturated polyester resin composition having 10–90 wt % of at least one high viscosity, high molecular weight unsaturated polyester, 10–80 wt % of at least one low viscosity, low molecular weight unsaturated polyester, and 9–30 wt % of at least one monomer. The cone and plate viscosity of the high molecular weight unsaturated polyester is 1 Pas/100° C. to 10 Pas/150° C. and the weight average molecular weight Mw is 1,200 to 10,000. The cone and plate viscosity of the low molecular weight unsaturated polyester is 1 Pas/25° C. to 4 Pas/100° C., and the weight average molecular weight Mw is 400 to 3,000.

20 Claims, No Drawings

COMPOUNDED UNSATURATED POLYESTER RESIN COMPOSITIONS WITH A REDUCED MONOMER CONTENT

This application is the national phase under 35 U.S.C. §371 of PCT International Application No. PCT/FI99/00869 which has an International filing date of Oct. 19, 1999, which designated the United States of America and was published in English.

The invention relates to unsaturated polyester resins and more particularly to compounded polyester resin compositions with reduced monomer contents, comprising at least two different types of unsaturated polyesters. The invention also relates to a method for the manufacture of such unsaturated polyester resins, of compounded resin compositions and to the use thereof.

Reducing the monomer content in unsaturated polyester resins has been a challenge for decades in the polyester composite and coating industry. Unsaturated polyester resins typically contain volatile unsaturated organic monomers, such as styrene. In commercially available unsaturated polyester resin applications, up to 50% of styrene or other vinyl monomers are used. During curing some of the organic monomer is usually lost in the atmosphere and this causes occupational safety hazards and it also is a problem because of environmental considerations. In most countries the legislation introduced in recent years requires a reduction in the amount of volatile organic compounds (VOC) which may be released to the atmosphere. Several methods have been proposed for reducing VOC emissions, for example the replacement of the volatile monomer with a less volatile monomer. This approach has led to slower curing times and/or incomplete curing at normal ambient temperatures. Another approach is a reduction in the amount of the monomer in the compositions. This approach has led to an increase in the viscosity of the resins beyond useable values. If the viscosity increase is compensated for by the use of a lower molecular weight polyester, then poor final product properties will result. Still another approach has been the use of a suppressant which reduces the loss of VOCs.

The suppressants are often waxes which may lead to a reduction in the interlaminar adhesion of laminating layers. The resin itself also sets limitations on the reduction of the monomer content, since the compositions have to be applicable with normal equipment, which means that the cone and plate viscosity (I.C.I.) of the resin cannot be raised too much and the finished products have to pass certain specifications depending on the field of application of products. In practice the level of the lowest monomer content in unsaturated polyester formulations keeps at 26–32 wt % depending on the application area and product specifications. The standard monomer level usually keeps between 35 and 45 wt %.

EP publication 0 395 154 discloses the use of unsaturated polyesters with styrene contents of 5–25%. However, the polyesters described in the examples do not represent normal polyesters but oligoesters with a significantly lower molecular weight. This clearly sets limitations on the applicability of the compounded resins. The products according to the examples of this publication, with varying contents of styrene, are not applicable as normal laminating resins, because the cone and plate viscosity of the resin is 10.1 at 23° C. Also, the mechanical properties of the cured resins do not comply with the requirements for standard laminating resins.

U.S. Pat. No. 5,688,867 describes a polyester resin comprising from about 5 wt % to about 50 wt % of a reactive diluent and from about 50 wt % to about 95 wt % of an unsaturated polyester resin, prepared from at least one component selected from a group consisting of from about 0.5% up to about 8 mol % of polyhydric alcohol having at least three hydroxyl groups, and at least one transesterification catalyst, from about 2% up to about 12 mol % as a reaction product of a polyol and a fatty carboxylic acid, and from about 2% up to about 12 mol % of a fatty reactant selected from the group consisting of a fatty primary alcohol, a fatty epoxide, a fatty monocarboxylic acid and mixtures thereof, wherein each member of the groups has up to about 100 carbon atoms. The publication provides resins and methods which have low emissions of volatile organic compounds.

However, the solutions of the state of the art have not offered a satisfactory way to formulate a polyester resin, which has proper mechanical properties and with a monomer content below 30 wt %, and which could be used in normal conventional applications, such as structural, sanitary, marine and coating applications, using conventional equipment and methods such as hand lay-up, spray, pultrusion and contact moulding. Thus there exists a need for unsaturated polyester resins with a reduced monomer content for conventional applications known in the art.

An object of the present invention is to provide unsaturated polyester resins and compounded resin compositions thereof with reduced monomer contents. Another object of the present invention is to provide methods for the manufacture of such unsaturated polyester resins and compounded resin compositions. A further object is the use of said resins and compounded resin compositions in normal conventional applications, such as structural, marine and coating applications.

The unsaturated polyester resins, compounded resin compositions, their use and the method for their manufacture are characterized in what is stated in the claims.

It has been found that unsaturated polyester resins with low monomer contents and a low viscosity can be prepared by selecting components compatibly, which components are then physically compounded. The total monomer level ranges between 9 and 30 wt % and preferably between 11 and 23 wt %. The compounded unsaturated polyester resin compositions according to the invention comprise at least two different types of unsaturated polyesters. According to the invention, a low viscosity, low molecular weight, high maleic content and/or methacrylate modified unsaturated polyester with a cone and plate (I.C.I.) viscosity of 1 Pas/25° C.–4 Pas/100° C., preferably 3 Pas/25° C.–3 Pas/100° C. and with weight average molecular weight Mw of 400–3000, preferably 800–2000, is compounded together with a high viscosity and high molecular weight unsaturated polyester with a cone and plate viscosity of 1 Pas/100° C.–10 Pas/150° C., preferably 3 Pas/100° C.–8 Pas/150° C. and with a molecular weight Mw of 1200–10000, preferably 1800–7000. Other suitable base resins may also be used if a specific property of a finished product is desired. Depending on selected linear unsaturated polyester resins, the obtained compounded product is diluted in 9–30%, preferably in 11–23% of a monomer or mixtures thereof. The cone and plate viscosity of the compounded resin composition is in the range of 2–8 Pas/25° C. and preferably 2–5 Pas/25° C.

The unsaturated polyester resin compositions with a low monomer content are compounded from base resins of at least two different types, one of them comprising a low molecular weight and low viscosity unsaturated polyester and one of them comprising a high molecular weight, high viscosity and high performance unsaturated polyester. The high performance unsaturated polyester means here an unsaturated polyester, which yields cured products with high quality and good mechanical properties.

Suitable starting materials for base resins are described in the following.

The maleic content, which denotes here the content of maleic acid, maleic anhydride and fumaric acid or mixtures thereof in starting materials, is suitably at least 40% by mole calculated from all acids and preferably at least 50% by mole in the low molecular weight polyester.

Benzoic acid, phthalic acid, phthalic anhydride, isophthalic acid, terephthalic acid, adipic acid, 1,2-cyclohexyl dicarboxylic acid and 1,4-cyclohexyl dicarboxylic acid or mixtures thereof are suitable as other acids and benzoic acid, phthalic acid, phthalic anhydride, isophthalic acid and terephthalic acid are preferable.

The ratio of acids to alcohols generally used in polyesters may be applied.

Alcohols required as other components in the polyesters have a general formula (I)

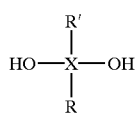

(I)

wherein
R and R' are the same or different and
X is $C_1$–$C_4$,
R is H, —$CH_2OH$, —$CH_3$, —$CH_2CH_3$, —$CH_2CH_2CH_3$ or —$CH_2CH_2CH_2CH_3$ and
R' is H, —$CH_2OH$, —$CH_3$, —$CH_2CH_3$, —$CH_2CH_2CH_3$ or —$CH_2CH_2CH_2CH_3$;
or certain aromatic alcohols can also be used.

Suitable alcohols are 2-ethyl hexanol, benzyl alcohol, 2-phenylethyl alcohol, ethylene glycol, 1,2-propylene glycol, 1,3-propylene glycol, 1,4-butane diol, 2-methyl-1,3-propane diol, neopentyl glycol, 2-butyl-2-ethyl-1,3-propane diol, 2,2,4-trimethyl-1,3-pentane diol, 1,6-hexane diol, trimethylol propane and trimethylol ethane. Part of the alcohols may be replaced by glycidyl compounds in order to obtain low molecular weight methacrylate or acrylate modified polyesters and suitably glycidyl methacrylate or glycidyl acrylate are used. 80 mol % of the alcohols can at most be replaced by glycidyl compounds, preferably not more than 60% by mole.

The high molecular weight, high performance unsaturated polyester resin can be conventional ortho- or iso-type of resin, prepared from the same starting materials as described for low molecular weight unsaturated polyester resins but processed to a high molecular weight using conventional condensation methods.

The resins are processed until an acid number of 5–65 is reached using in conventional reactors for polyesters, removing the excess of water during the reaction and applying a vacuum at the end of the polymerisation. Esterification catalysts known in the art may be used. During the addition of possible endcappers, which here refer to glycicyl compounds, the reaction temperatures may be decreased if necessary.

If the alcohol component is partly replaced by glycidyl compounds, inhibitors may be used for the prevention of polymerization, suitable inhibitors being quinones, such as hydroquinone and hydroquinone monomethylether.

A compounded unsaturated polyester resin composition according to the invention with a low monomer content comprises:

10–90 wt %, preferably 20–70 wt % and particularly preferably 30–60 wt % of at least one and preferably of one to four high viscosity, high molecular weight unsaturated polyesters, 10–80 wt %, preferably 10–60 wt % and of at least one and preferably of one to three low molecular weight unsaturated polyesters, 9–30 wt %, preferably 11–23 wt % of at least one monomer, 0–5 wt % of a copromoter, preferably acetoacetoxy ethyl methacrylate, 0.1–0.5 wt % of promoter, preferably a metal compound, such as cobalt, manganese, iron, vanadium, copper or an aluminium salt of an organic acid, such as an octoate or naphthenate salt, 0.1–0.5 wt % of an amine promoter like dimethylaniline, diethylaniline, 2-amino-pyridine, N,N-dimethyl acetoacetamide, acetoacetanilide or other organic compounds like ethyl acetoacetate, methyl acetoacetate and N,N-dimethyl-p-toluidine, and 0.5–3 wt % of a peroxide catalyst to initiate the polymerization of the composition, preferably methyl ethyl ketone peroxide or benzoyl peroxide.

The monomer is preferably an ethylenically unsaturated compound, which include allyl and vinyl compounds conventionally used for the preparation of unsaturated polyester mouldings, impregnating and coating compositions. Examples of suitable monomers include styrene, substituted styrenes, such as methoxystyrene, divinyl-benzene, 4-ethylstyrene, 4-methylstyrene, 4-t-butylstyrene, p-chlorostyrene or vinyltoluene, esters of acrylic acid and methacrylic acid with alcohols or polyols such as methyl methacrylate, butyl acrylate, ethylhexyl acrylate, hydroxypropyl methacrylate, lauryl acrylate, stearyl methacrylate, lauryl methacrylate, butane-diol diacrylate, ethyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, allyl esters, such as diallyl phthalate, and vinyl esters, such as vinyl ethylhexanoate, vinyl pivalate, limonene, dipentene, vinyl ethers, indene, allyl benzene, and the like and mixtures thereof. Preferred monomer is styrene.

A reduced monomer level is a clear advantage in reducing the monomer emissions. The mechanical strength of the cured polyester products manufactured from the compounded resin compositions varies between 60% and 120% of the requirements for lamination resins according to ISO, DNV (Det Norske Veritas) or other applicable standards, depending on the quality of chosen resins. If some additional performance is needed, either the base resin or the diluting resin may be reinforced chemically by modifying the resin skeleton by methacrylate end-groups.

The obtained compounded resin compositions are well suited for application where good mechanical properties are required. They show a remarkable benefit in solubility, in applicability and in the properties of the finished cured products. They may be used as such, together with reinforcing agents, filled or unfilled, in laminates, or in gelcoats to produce composites or coatings for various applications. The compounded resin compositions according to the invention may be formulated together with suitable additives known in the art to form gelcoats, resins and polyester products. Gelcoats are curable compositions, which comprise at least one of the above compounded polyester resin compositions with additives. Suitable additives include thixotropic agents, thixotropy enhancers, suppressants, surface tension agents, co-promoters, promoters, air release agents, fillers, wetting agents, levelling agents and pigments.

The following examples provide a better understanding of the invention however they are not intended as limiting the scope thereof.

EXAMPLE 1

Preparation of High Performance Polyester 1

35 mol % of phthalic anhydride, 15 mol % of benzoic acid, and 15 mol % of trimethylol propane are esterified in a condensation reactor at 190–210° C. During the reaction the generated water is removed by nitrogen purge through a separation column. When an acid number of 30–35 is reached, the temperature in the reactor is adjusted to approx. 120° C. 35 mol % of glycidyl methacrylate is added slowly into the reactor. After the addition heating is continued for additional 1–2 h. The final product has a cone and plate viscosity of 6.0 Pas/100° C., an acid number of 2.8 and a molecular weight Mw of 1500.

EXAMPLE 2

Preparation of High Performance Polyester 2

35 mol % of maleic anhydride, 10 mol % of terephthalic acid, 33 mol % of ethylene glycol, 11 mol % of 2-methylpropane diol and 11 mol % of 2-ethylhexanol are esterified in a condensation reactor at 190–220° C. During the reaction the generated water is removed by nitrogen purge through a separation column. The esterification is completed by applying a vacuum (200 mbar) to the reactor. The product has a cone and plate viscosity of 1.0 Pas/125° C., an acid number of 5 and molecular weight Mw of 2300.

EXAMPLE 3

Preparation of High Performance Polyester 3

28 mol % of maleic anhydride, 21 mol % of terephthalic acid and 51 mol % of 2-methylpropane diol are esterified in a condensation reactor at 190–220° C. During the reaction the generated water is removed by nitrogen purge through a separation column. The esterification is completed by applying a vacuum (200 mbar) to the reactor. The product has a cone and plate vidcosity of 6.4 Pas/150° C., an acid number of 21 and a molecular weight Mw of 5700.

EXAMPLE 4

Preparation of High Performance Polyester 4

17 mol % of maleic anhydride, 28 mol % of phthalic anhydride, 2 mol % of adipic acid, 48 mol % of propylene glycol and 5 mol % of ethylene glycol are esterified in a condensation reactor at 190–220° C. During the reaction the generated water is removed by nitrogen purge through a separation column. The esterification is completed by applying a vacuum (200 mbar) to the reactor. The product has a cone and plate viscosity of 5.0 Pas/125° C., an acid number of 20 and a molecular weight Mw of 4500.

EXAMPLE 5

Preparation of High Performance Polyester 5

29 mol % of maleic anhydride, 15 mol % of phthalic anhydride, 44 mol % of 2-methylpropane diol and 12 mol % of benzyl alcohol are esterified in a condensation reactor at 190–220° C. During the reaction the generated water is removed by nitrogen purge through a separation column. The esterification is completed by applying a vacuum (200 mbar) to the reactor. The product has a cone and plate viscosity of 3.2 Pas/100° C., an acid number of 18 and a molecular weight Mw of 1900.

EXAMPLE 6

Preparation of Low Viscosity Polyester 6

22 mol % of maleic anhydride, 11 mol % of phthalic anhydride, 11 mol % terephthalic of anhydride, 21 mol % of ethylene glycol, 13 mol % of diethylene glycol and 22 mol % of ethylhexanol are esterified in a condensation reactor at 190–220° C. During the reaction the generated water is removed by nitrogen purge through a separation column. The esterification is completed by applying a vacuum (200 mbar) to the reactor. The product has a cone and plate viscosity of 11.0 Pas/50° C., an acid number of 21 and a molecular weight Mw of 1300.

EXAMPLE 7

Preparation of Low Viscosity Polyester 7

40 mol % of maleic anhydride, 20 mol % of dipropylene glycol, 20 mol % of benzyl alcohol and 20 mol % of 2-ethylhexanol are esterified in a condensation reactor at 190–220° C. During the reaction the generated water is removed by nitrogen purge through a separation column. The esterification is completed by applying a vacuum (200 mbar) to the reactor. The product has cone and plate viscosity of 4.0 Pas/25° C, an acid number of 17 and a molecular weight Mw of 800.

EXAMPLE 8

Preparation of Low Viscosity Polyester 8

40 mol % of maleic anhydride, 30 mol % of ethylene glycol and 20 mol % of benzyl alcohol are esterified in a condensation reactor at 190–220° C. During the reaction the generated water is removed by nitrogen purge through a separation column. The esterification is driven below an acid number of 65, preferably below 45 and 10 mol % of glycidyl methacrylate is added to the reaction mixture at 120° C. The obtained modified resin has a cone and plate viscosity of 1.0 Pas/100° C., an acid number of 5 and a molecular weight Mw of 1400.

EXAMPLE 9

Preparation of Low Viscosity Polyester 9

43 mol % of maleic anhydride, 27 mol % of dipropylene glycol, 8 mol % of ethylene glycol and 4 mol % of diethylene glycol are esterified in a condensation reactor at 190–220° C. During the reaction the generated water is removed by nitrogen purge through a separation column. The esterification is driven below an acid number of 65, preferably below 45 and 18 mol % of glycidyl methacrylate is added to the reaction mixture at 120° C. The modified resin has a cone and plate viscosity of 2.0 Pas/100° C., an acid number of 19 and a molecular weight Mw of 1900.

EXAMPLE 10.

Preparation of Low Viscosity Polyester 10

42 mol % of maleic anhydride, 25 mol % of dipropylene glycol, 12.5 mol % of 2-ethyl hexanol and 12.5 mol % of benzyl alcohol are esterified in a condensation reactor at 190–220° C. During the reaction the generated water is removed by nitrogen purge through a separation column. The esterification is driven below an acid number of 65, preferably below 45 and 8 mol % of glycidyl methacrylate is added to the reaction mixture at 120° C. The modified resin has a cone and plate viscosity of 4.1 Pas/50° C., an acid number of 4 and a molecular weight Mw of 1300.

EXAMPLE 11

Preparation of a Compounded Polyester Composition with a 23% Styrene Content 31 wt % of high performance polyester 1, 31 wt % of low viscosity polyester 9 and 15 wt % of low viscosity polyester 7 are diluted in 23 wt % of styrene. In addition, promoters are added.

EXAMPLE 12

Preparation of a Compounded Polyester Composition with a 20% Styrene Content 60 wt % of high performance polyester 1 and 20 wt % of low viscosity polyester 9 are diluted in 20 wt % of styrene. In addition promoters are added.

EXAMPLE 13

Preparation of a Compounded Polyester Composition with a 17% Styrene Content 30 wt % of high performance polyester 5, 19.5 wt % of high performance polyester 3, 24 wt % of low viscosity polyester 7 and 9.5 wt % of low viscosity polyester 10 are diluted in 17 wt % of styrene. In addition promoters are added.

EXAMPLE 14

Preparation of a Compounded Polyester Composition with a 15% Styrene Content 47 wt % of high performance polyester 1 and 32.4 wt % of low viscosity polyester 7 are diluted in 15 wt % of styrene. In addition promoters are added.

EXAMPLE 15

Preparation of a Compounded Polyester Composition with a 11% Styrene Content 57 wt % of high performance polyester 4, and 32 wt % of low viscosity polyester 7 are diluted in 11 wt % of styrene. In addition promoters are added.

EXAMPLE 16

Preparation of a Compounded Polyester Composition with a 11–23% Styrene Content

To the compounded polyester resin compositions prepared in the examples 11–15 1.0 wt % of methyl ethyl ketone peroxide is added to start the curing and the mixtures are cast in a mould without a filler. Mechanical properties of the cured samples are listed in Table 1.

TABLE 1

Mechanical properties of cured low styrene unsaturated polyester compositions.

| | Example 11 | Example 12 | Example 13 | Example 14 | Example 15 |
|---|---|---|---|---|---|
| Styrene content (%) | 23 | 20 | 17 | 15 | 11 |
| Tensile strength (Mpa) | 66 | 66 | 42 | 42 | 36 |
| Tensile modulus (Mpa) | 3330 | 3120 | 2170 | 2310 | 1980 |
| Flexural strength (Mpa) | 108 | 123 | 76 | np | np |
| Flexural modulus (Mpa) | 3020 | 3230 | 2200 | np | np |
| Elongation at break (%) | 3 | 4 | 3 | 4 | 4 |
| Heat distortion Temperature (° C.) | 64 | 56 | 51 | np | np | np = not performed

EXAMPLE 17

Application of a Compounded Resin Composition as a Base Resin for Gelcoats 25 wt % of high performance resin 1, 30 wt % of low viscosity resin 8 and 20 wt % of low viscosity resin 6 are diluted in 25 wt % of styrene. A gelcoat is prepared by the following formula:
RESIN 50.4
Cu-naphtenoate 0.01
Air release agent 0.5
Fillers 20
Pigment 18
Promoters 1
STYRENE 5
Other additives 5.09

The applied gelcoat according to this formula has a good appearance, good spray-ability and following general properties: COLOR/CALIB WHITE L −4.69, a 0.35, b 2.89, GLOSS 20° 800/1000 um 70/63, GLOSS 60° 800/1000 um 88/86.

What is claimed is:
1. A compounded unsaturated polyester resin composition, wherein the composition comprises 10–90 wt % of at least one high viscosity, high molecular weight unsaturated polyester, 10–80 wt % of at least one low viscosity, low molecular weight unsaturated polyester and 9–30 wt % of at least one monomer, and that the cone and plate viscosity of the high molecular weight unsaturated polyester is 1 Pas/100° C.–10 Pas/150° C. and the weight average molecular weight Mw is 1,200–10,000, and the cone and plate viscosity of the low molecular weight unsaturated polyester is 1 Pas/25° C.–4 Pas/100° C. and the weight average molecular weight Mw is 400–3,000.

2. The compounded unsaturated polyester resin composition according to claim 1, wherein the composition comprises one to four high molecular weight unsaturated polyesters and one to three low molecular weight unsaturated polyesters.

3. The compounded unsaturated polyester resin composition according to claim 1 or 2, wherein the composition comprises 20–70 wt % of high molecular weight unsaturated polyester, 10–60 wt % of low molecular weight unsaturated polyester and 11–23 wt % of monomer.

4. The compounded unsaturated polyester resin composition according to claim 1, wherein the composition comprises 30–60 wt % of high molecular weight unsaturated polyester, 10–60 wt % of low molecular weight unsaturated polyester and additionally 0–5 wt % of a copromoter, 0.1–0.5 wt % of a promoter, and 0.1–0.5 wt % of an amine promoter.

5. The compounded unsaturated polyester resin composition according to claim 1, wherein the cone and plate viscosity of the high molecular weight unsaturated polyester is 3 Pas/100° C.–8 Pas/150° C. and the weight average molecular weight Mw is 1,800–7,000, and the cone and plate viscosity of the low molecular weight unsaturated polyester is 3 Pas/25° C.–3 Pas/100° C. and the weight average molecular weight Mw is 800–2,000.

6. The compounded unsaturated polyester resin composition according to claim 1, wherein the cone and plate viscosity of the compounded resin composition is 2–8 Pas/25° C.

7. The compounded unsaturated polyester resin composition according to claim 1, wherein the cone and plate viscosity of the compounded resin composition is 2–5 Pas/25° C.

8. The compounded unsaturated polyester resin composition according to claim 1, wherein the composition is curable by adding 0.5–3 wt % of a peroxide catalyst.

9. A method for the manufacture of a compounded unsaturated polyester resin composition, wherein 10–90 wt % of at least one high viscosity, high molecular weight unsaturated polyester with a cone and plate viscosity of 1 Pas/100° C. to 10 Pas/150° C. and a weight average molecular weight Mw of 1,200 to 10,000, 10–80 wt % of at least one low viscosity, low molecular weight unsaturated polyester with a cone and plate viscosity of 1 Pas/25° C. to 4 Pas/100° C. and a weight average molecular weight Mw of 400 to 3,000, 9–30 wt % of at least one monomer, 0–5 wt % of a copromoter, 0.1–0.5 wt % of a promoter, and 0.1–0.5 wt % of an amine promoter are compounded together to form said unsaturated polyester resin composition.

10. The method for the manufacture of a compounded unsaturated polyester resin composition according to claim 9, wherein the composition comprises one to four high molecular weight unsaturated polyesters and one to three low molecular weight unsaturated polyesters.

11. The method for the manufacture of a compounded unsaturated polyester resin composition according to claim 9 or 10, wherein the composition comprises 20–70 wt % of high molecular weight unsaturated polyester, 10–60 wt % of low molecular weight unsaturated polyester and 11–23 wt % of monomer.

12. The method for the manufacture of a compounded unsaturated polyester resin composition according to claim 9, wherein the composition comprises 30–60 wt % of high molecular weight unsaturated polyester and 10–60 wt % of low molecular weight unsaturated polyester.

13. The method for the manufacture of a compounded unsaturated polyester resin composition according to claim 9, wherein the cone and plate viscosity of the high molecular weight unsaturated polyester is 3 Pas/100° C.–8 Pas/150° C. and the weight average molecular weight Mw is 1,800–7,000, and the cone and plate viscosity of the low molecular weight unsaturated polyester is 3 Pas/25° C.–3 Pas/100° C. and the weight average molecular weight Mw is 800–2,000.

14. The method for the manufacture of a compounded unsaturated polyester resin composition according to claim 9. wherein the cone and plate viscosity of the compounded resin composition is 2–8 Pas/25° C.

15. The method for the manufacture of a compounded unsaturated polyester resin composition according to claim 9, wherein the cone and plate viscosity of the compounded resin composition is 2–5 Pas/25° C.

16. The method for the manufacture of a compounded unsaturated polyester resin composition according to claim 9, wherein the composition is cured by adding 0.5–3 wt % of a peroxide catalyst.

17. A laminate comprising the compounded unsaturated polyester resin composition according to claim 1 or obtained by the method according to claim 9, as such and/or as filled and/or as fibre reinforced.

18. A gelcoat comprising additives and at least one compounded unsaturated polyester resin composition according to claim 1 or obtained by the method according to claim 9.

19. A composite comprising the compounded unsaturated polyester resin composition according to claim 1 or obtained by the method according to claim 9, as such and/or as filled and/or as fibre reinforced.

20. A coating comprising the compounded unsaturated polyester resin composition according to claim 1 or obtained by the method according to claim 9, as such and/or as filled and/or as fibre reinforced.

\* \* \* \* \*